Aug. 31, 1948.  J. MICHAEL  2,448,109
FURRING STRIPS AND CHANNELS
AND CONNECTING STRUCTURE
Filed Jan. 18, 1946  2 Sheets-Sheet 1

INVENTOR.
Jack Michael,
BY
William J. Wessler,
ATTORNEY.

Aug. 31, 1948.  J. MICHAEL  2,448,109
FURRING STRIPS AND CHANNELS
AND CONNECTING STRUCTURE
Filed Jan. 18, 1946  2 Sheets-Sheet 2

INVENTOR.
Jack Michael,
BY
William J. Wesseler,
ATTORNEY.

Patented Aug. 31, 1948

2,448,109

UNITED STATES PATENT OFFICE 2,448,109

FURRING STRIPS AND CHANNELS AND CONNECTING STRUCTURE

Jack Michael, Cleveland, Ohio

Application January 18, 1946, Serial No. 641,898

3 Claims. (Cl. 72—118)

This invention, as indicated, relates to a furring strip or furring channel construction with associated means for supporting the same, such furring strips providing a base to which lath or any selected finishing elements such as tile, wallboard or the like may be attached. More particularly, it comprises furring channels formed of elongated metal members incorporating means permitting the overlaying and securing of finishing surfaces or structural elements thereto such as lath, sheet material of various types or any selected wall or ceiling finishing or structural units found suitable.

The elongated furring channels preferably are hollow substantially rectangular units having a perforable area to provide a point of support for nails, screws or other fastening elements holding the wall or ceiling material thereto. The invention permits of greater speed in finishing an interior wall or ceiling structure and at the same time an improved appearance is brought about and greater security and permanence of the fastenings is provided for. In many instances, building regulations require that the entire structure be fireproof and the invention supplies means to fully comply therewith. The furring channels are formed of somewhat rectangular hollow members of thin sheet metal, providing a surface adapted to be engaged by nails, wide-threaded screws, toggle bolts, or any other suitable means for attaching structural units. The channel furring strips may be attached to either wall or ceiling structures, and the ceilings may be either furred or suspended ceilings.

The principal object of the present invention is to provide a furring strip construction adapted to be attached to wall or ceiling structures and serve as the immediate supports to which lath, composition boards, or any structural finishing units may be secured.

Another object of the invention is to provide a furring strip of light sheet metal adapted for use in conventional manner, such channel providing a predetermined area adapted to receiving fastening elements for structural units to be retained in permanent engagement therewith.

Another object of the invention is to provide an elongated furring strip adapted to be filled with perforable composite material whereby nails, screw fastenings and the like may be readily engaged therewith to hold units firmly thereto.

Another object of the invention is to provide a composite substantially rectangular elongated metallic furring member formed of interengaged channel strips with or without soft filling material into which nails, screws or other fastening elements can be readily engaged holding structural units permanently to such elongated strip.

Another object of the invention is to provide a closed rectangular furring strip formed of nested channel members engaged over a wood nailing strip and protecting the same against destruction by fire or from attack by insects.

Other and further objects of the invention will appear in the following descriptions:

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but several of various structural forms in which the principle of the invention may be used.

Figure 1:
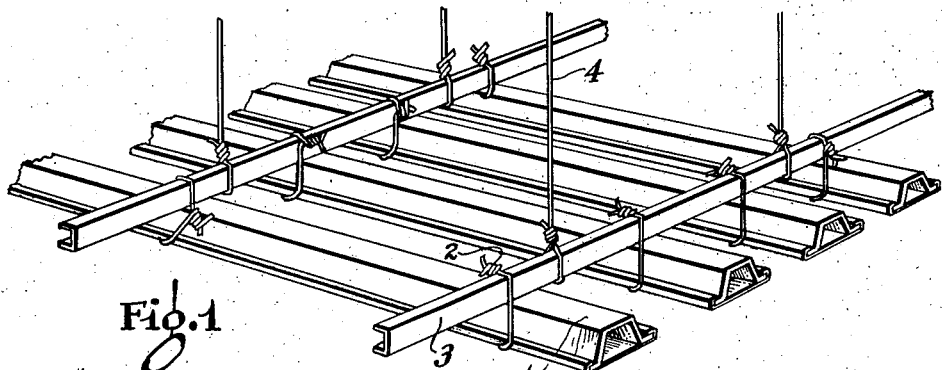
Figure 1 is a perspective view showing a suspended ceiling structure with carrying bars and a series of furring strips or channels supported thereon in spaced parallel relation.

The various forms of furring strips are utilized in structures with the suspended type of ceiling such as is shown in Figure 1 or in the furred ceilings shown in Figures 2, 3, 4 and 5.

Figure 11:
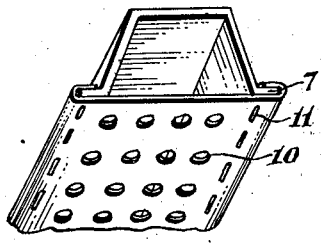
Figure 11 is a fragmentary perspective view showing a furring channel of inverted, flattened V-type with a bottom strip of thin gage metal having preformed perforations.

As is clearly shown in Figure 1 of the drawing, when a suspended ceiling is to be installed the furring channels 1 are attached by means of wires 2 to carrier bars 3 which are suspended at the ends of wires 4, the free ends of which are embedded in the ceiling in the course of construction. The furring channels may be variously formed, as is shown in Figures 6-16 inclusive. The form shown in Figure 6 comprises a channel of inverted V-shape, the V being flattened, and in cross-section in the form of a truncated cone having a flat web portion 5 and inclined side portions 6. It also has short horizontal flanges 7 along each marginal free edge. In order to provide a means for receiving the fastening elements to hold the structural elements of the ceiling, an elongated sheet of thin gage metal 8 to provide a bottom wall is secured to the channel by bending the marginal portions 9 of the thin metal strip to engage over the marginal flanges of the channel member which, as shown in Figure 11, may be provided with preformed perforations 10.

Figure 2:
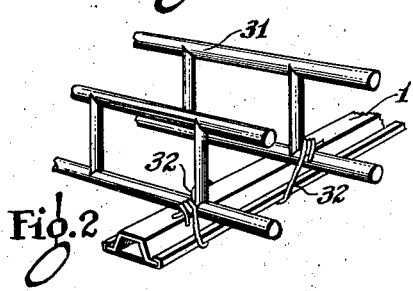
Figure 2 is a fragmentary perspective view showing a furring channel secured to a bar joist.
Figure 3:
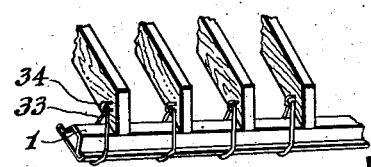
Figure 3 is a fragmentary perspective view showing a furring channel secured to a wood joist.
Figure 4:
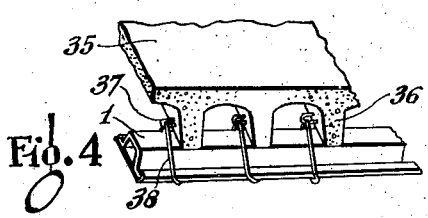
Figure 4 is a fragmentary perspective view showing a furring channel secured to the webs on the under side of a concrete floor.
Figure 5:
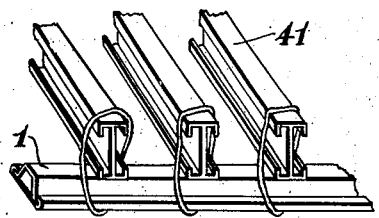
Figure 5 is a fragmentary perspective view showing a furring channel secured to the under side of metallic lumber elements.
Figure 7:
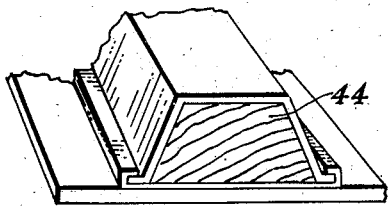
Figure 7 is a view similar to Figure 6 showing the furring channel provided with a filling of wood to assist in providing a nailing base.
Figures 8, 9:
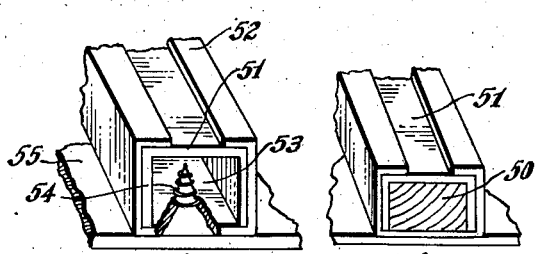
Figure 8 is a fragmentary perspective view illustrating another type of furring channel wherein a light gage perforable strip is overlapped about an inverted U-shaped channel, a wide-threaded screw fastening being shown in position.
Figure 9 is a view similar to Figure 8 showing a wood filling within the composite rectangular furring strip of the type shown in Figure 8.
Figure 10:
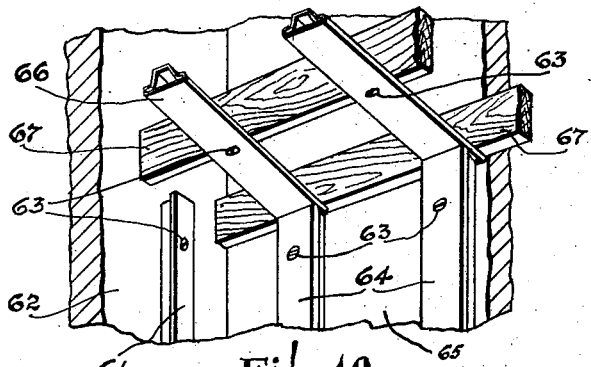
Figure 10 is a fragmentary perspective view showing the preferred form of furring strips attached to an outside and an inside wall surface respectively, and also attached directly to the under side of the joists of the floor above.

As is clearly shown in Figure 2, the furring strip or channel 1 is connected to a bar joist 31 by means of wire loops 32. Where the furring channel is to be attached to a wooden joist as shown in Figure 3, loops 33 are engaged about the furring channel and the loops are secured by means of staples 34 to the adjacent portion of the joist. When the furring channel 7 is to be secured to a concrete structure 35 with webs 36 formed by inverted U-shaped pans, wires 37 are embedded in the concrete before it sets and wire loops 38 are then engaged around the furring channel to hold the same firmly in engagement with the under side of said webs, as shown in Figure 4. Where the construction utilizes what is known as metal lumber 41, usually formed of I beams of extremely thin-walled metal with marginal flanges 42, the furring channel 1 is held to the under side of said channel by means of wire loops 43 as shown in Figure 5. Although the preferred form of furring channel is that illustrated in Figure 6 wherein the channel 5 is of heavy gage and the bottom plate is of thin gage metal, for many purposes it is also desirable to have a wood filler 44 within the channel just referred to, as shown in Figure 7. While the form of construction illustrated in Figures 6-7, and 10-15 for the individual channels is preferred, it is to be understood that as shown in Figure 8 the channels may also be made of an inverted U-shaped member 51 of substantially square cross-sections about which a thin metal web 52 is engaged, such web forming the thin bottom plate 53 of the channel through which screw-threaded members 54 may be engaged holding to the under face of the channel suitable ceiling base material such as the plaster board 55. For certain constructions, a filling 56 of wood or plastic composition may be utilized in order to provide better nailing foundation against which to secure the tile, plaster board or other base material used for the ceiling, as shown in Figure 9. It should be noted, however, that Figure 11 shows the thin metal section as engaged about the marginal flanges 7 of the channel member and also held by means of marginal staples 11 to such flanges.

Figure 6:
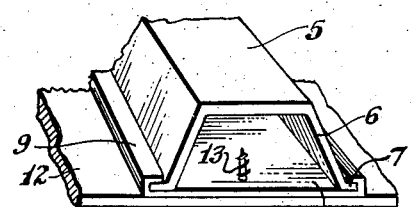
Figure 6 is a fragmentary perspective view showing one type of furring channel embodying the principles of the invention with a plaster board unit in supported relation thereunder.
Figure 12:
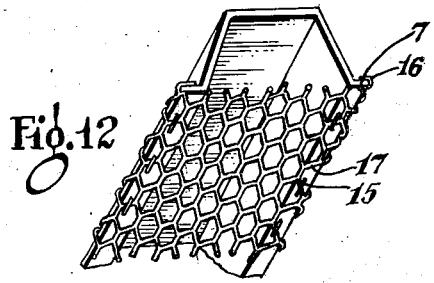
Figure 12 is a view similar to Figure 10 with the bottom strip formed of an expanded metal strip suitably secured to the flanges of the flattened V-shaped channel member.
Figure 15:
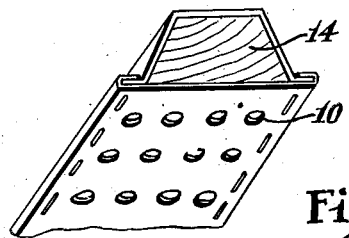
Figure 15 illustrates a furring channel of flattened inverted V-shape having a wood or composition filler and a thin bottom strip having preformed perforations.

Figure 6 shows a base member for the ceiling 12 secured by means of a heavily threaded screw 13 through a perforation formed in the thin metal member. As has been indicated, in place of forming the perforations at selected points on a plain unperforated bottom member, it is preferable to supply a full series of perforations similar to perforations shown in Figure 11 of the drawing. The channel member, in some instances, will not only have the preformed perforations 10 but as shown in Figure 15 will have a filling 14 of wood or composition of a degree of softness permitting the securing of nails, screws or the like through the perforated member and into the filling. In place of using a perforated bottom member in many instances it is desirable to use an expanded metal strip 15 such as is shown in Figure 12 of the drawing, the margins of said strip 16 being folded around the channel member and being held thereto by staples 17.

While staples have been referred to as holding the bottom member to the channel member, it is to be understood that in most instances any preferred form of securing the bottom member to the channel member may be used, such as spot welding, riveting or slip-over channels.

Figure 13:
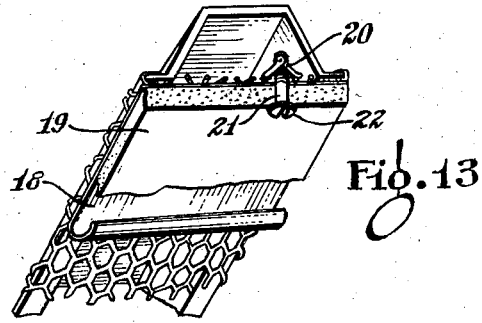
Figure 13 is a fragmentary perspective view as seen from below of a flattened V-shaped channel member provided with a bottom strip of expanded metal covered with a coating of adhesive paper and with a block of tiling secured thereto by means of a toggle bolt.

In many instances, it is desirable to fasten the base elements of the ceiling to the bottom strip of the channel member by means of adhesive, and in some instances the bottom piece of the channel member is coated with a layer of paper 18 which then serves as a base for securing board or tile 19 thereto by bonding means together with toggles 20, as illustrated in Figure 13, the bifurcated toggle member 21 spreading and bearing against the expanded metal member when drawn downwardly by means of the screw 22.

Figure 14:
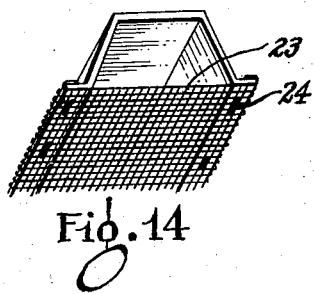
Figure 14 is a view similar to Figures 10 and 11 with a bottom strip formed of mesh or screening and suitably secured by means of staples.
Figure 16:
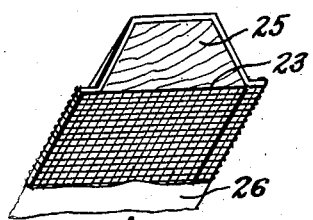
Figure 16 is a furring channel of flattened inverted V-shaped cross-section having a mesh or screening secured thereto, such mesh being overlaid with a layer of paper glued thereto.

It has been found very satisfactory to use mesh or screening 23 as the perforable bottom member of the furring channel such as is shown in Figure 14. This strip of screening also may be fastened to the channel strip by means of staples or by other means such as riveting, spot welding or the like. The mesh type of structure may be provided with a wood or composition filler 25 such as is shown in Figure 16 and it also may be provided with a paper base 26 secured directly to mesh 23 by means of glue together with staples if desired.

As has been stated the furring strips or channels may be used not only in furred or suspended ceilings but also on the inner surfaces of outside walls, or on inner walls, in vertical or horizontal position as required. Thus in Figure 10 the vertical furring strip 61 of the preferred construction shown in Figure 6 is secured to an outside wall 62 by means of expanding bolts 63. Expanding bolts may also be used to attach furring strips 64 to the inner wall 65 and the ceiling furring strips 66 to the under side of the joists 67. The finishing units of lath of all types, tile, plaster board or other composition board, plywood or any other selected material may then be attached to the furring strips as above described.

The use of metal furring strips against an outside wall provides an air space which avoids dampness in many localities. The invention thus is of broad utility and of long service life, as well as easy to install and suitable for full fireproof constructions.

Other modes of applying the principle of my invention may be employed instead of the ones explained, change being made as regards the structure herein disclosed, provided the means stated by any of the following claims or the equivalent of such stated means be employed.

I therefore particularly point out and distinctly claim as my invention:

1. A furring strip adapted to support a ceiling and comprising an elongated structural channel shape secured in position with the web of said channel shape upward and with the sides of said channel shape extending downwardly, strengthening flanges along the bottom edges of said sides, and sheet material readily penetrable by a fastening screw secured to said flanges and spanning the open bottom of said channel shape and adapted to receive securing members for holding said ceiling.

2. A furring strip adapted to support a ceiling and comprising an elongated structural channel shape of inverted truncated V section secured in position with the web of said channel shape upward and with the sides of said channel shape extending downwardly, strengthening flanges along the bottom edges of said sides and extending outwardly therefrom and sheet material readily penetrable by a fastening screw secured to said flanges and spanning the open bottom of said channel shape and adapted to receive securing members for holding said ceiling.

3. A furring strip adapted to support a ceiling and comprising an elongated structural channel shape of inverted truncated V section secured in position with the web of said channel shape upward and with the sides of said channel shape extending downwardly, strengthening flanges along the bottom edges of said sides and extending outwardly therefrom and a sheet of imperforate sheet metal secured to said flanges and closing the open bottom of said channel shape, said sheet metal adapted to be perforated by a metal screw for attaching ceiling material thereto.

JACK MICHAEL.

REFERENCES CITED

The following references are of record in the file of this patent:

UNITED STATES PATENTS

| Number | Name | Date |
| --- | --- | --- |
| 1,655,406 | Bennett | Jan. 10, 1928 |
| 1,878,812 | Berger | Sept. 20, 1932 |
| 2,160,794 | Price | May 30, 1939 |